United States Patent
Chaskar et al.

(10) Patent No.: US 6,898,205 B1
(45) Date of Patent: May 24, 2005

(54) ROBUST TRANSPORT OF IP TRAFFIC OVER WDM USING OPTICAL BURST SWITCHING

(75) Inventors: Hemant Chaskar, Woburn, MA (US); Sanjeev Verma, Woburn, MA (US); Rayaclurgam Ravikanth, Waltham, MA (US); Sudir Dixit, Weston, MA (US)

(73) Assignee: Nokia, Inc., Burlington, MA (US)

( * ) Notice: Subject to any disclaimer, the term of this patent is extended or adjusted under 35 U.S.C. 154(b) by 0 days.

(21) Appl. No.: 09/563,338

(22) Filed: May 3, 2000

Related U.S. Application Data
(60) Provisional application No. 60/161,518, filed on Oct. 26, 1999.

(51) Int. Cl.[7] .................. H04L 12/403; H04L 12/42
(52) U.S. Cl. .................. 370/450; 370/461; 370/465; 375/63; 375/130; 398/51; 398/54; 398/58
(58) Field of Search .................. 370/450, 461, 370/465, 352, 375, 360, 386, 390, 413, 442, 463; 375/130, 163; 398/51, 54, 56

(56) References Cited

U.S. PATENT DOCUMENTS

| | | | | |
|---|---|---|---|---|
| 5,606,555 A | * | 2/1997 | Singer | 370/465 |
| 5,982,780 A | * | 11/1999 | Bohm et al. | 370/450 |
| 6,661,789 B1 | * | 12/2003 | Cankaya et al. | 370/390 |

FOREIGN PATENT DOCUMENTS

| WO | 1809498 | 4/2001 |
|---|---|---|

OTHER PUBLICATIONS

Optical Burst Switching (OBS)–A New Paradigm for an Optical Internet, Chumming Qiao and Myungsik Yoo, University of Buffalo, Buffalo, New York 14260.*

Yoo, M. et al: "New Optical Burst Switching Protocol for Supporting Quality of Service" Proceedings of the SPIE, SPIE, Bellingham, VA, US, vol. 3531, Nov. 1998, pp. 396–405 XP0009550072, paragraph '002.

Qiao, C. et al: "Choices, Features and Issues in Optical Burst Switching", Optical Networks Magazine, SPIE, Bellingham, WA, US, vol. 1, No. 2, Apr. 2000, pp. 36–44, XP000969814, ISSN: 1388–6916, paragraph 0005.

Danielsen et al., "User Control Modes and IP Allocation," Presented at MIT Workshop on Internet Economics, 10 pp., Mar. 1995.

Ge et al., "On Optical Burst Switching and Self Similar Traffic."

Qiao et al., "Optical Burst Switching (OBS)—A New Paradigm for an Optical Internet," Lander, University of Buffalo, 23 pp.

(Continued)

Primary Examiner—Dang Ton
Assistant Examiner—Inder Pal Mehra
(74) Attorney, Agent, or Firm—Antonelli, Terry, Stout & Kraus, LLP

(57) ABSTRACT

A technique for selecting the offset between data bursts and their respective control packets in an optical burst switching arrangement includes: randomly generating a plurality of tokens; receiving a plurality of sequentially generated data bursts; and receiving a plurality of control packets, each control packet corresponding to a respective one of the plurality of data bursts. One of the plurality of control packets is first outputted and its corresponding respective data burst is then outputted at a time corresponding to the generation of the first of the plurality of tokens which occurs at a time in which no data burst is being outputted, the outputting of the data burst being offset from the output of its corresponding respective control packet by a time period. The average rate at which the plurality of data bursts are outputted may be equal to the reciprocal of the mean of the probability distribution used to generate the plurality of tokens. The plurality of tokens may be randomly generated according to a Poisson process.

32 Claims, 4 Drawing Sheets

OTHER PUBLICATIONS

Turner, "Terabit Burst Switching," *Journal of High Speed Networks,* 18 pp., 1999.

Yoo et al., "A New Optical Burst Switching Protocol for Supporting Quality of Service," 10 pp.

Yoo et al., "Just–Enough–Time (JET): A High Speed Protocol for Bursty Traffic in Optical Networks," *IEEE Communications Mag.,* pp. 130–135, Mar. 1990.

* cited by examiner

ROBUST TRANSPORT OF IP TRAFFIC OVER WDM USING OPTICAL BURST SWITCHING

CROSS-REFERENCE TO RELATED APPLICATION

This application claims the benefit of the filing date of U.S. Provisional Application Ser. No. 60/161,518, filed Oct. 26, 1999.

BACKGROUND OF THE INVENTION

1. Field of the Invention

The present invention relates to the routing of Internet Protocol (IP) traffic using optical burst switching and more particularly the present invention relates to selecting the offset between a control packet and a data burst to optimize the network performance.

2. Description of the Related Art

Rapid growth in the volume of Internet traffic over the last decade has generated a considerable amount of interest in devising new high-speed transmission and switching technologies. Wavelength division multiplexing can support a number of simultaneous high-speed channels on a single optical fiber and can thereby provide an enormous bandwidth at the physical layer. In order to exploit this bandwidth to meet the future traffic requirements, higher layer communication protocols must be developed to make efficient use of the transmission capacity of such optical fiber arrangements.

Presently, wavelength division multiplexing deployment comes in two varieties, namely, wavelength routing and SONET/SDH framing on wavelengths. In wavelength routing, a complete wavelength (or a sequence of wavelength segments joined by wavelength converters is assigned to a communication path between the two end-points. Such wavelength paths are preconfigured, and there is no need for optics-electronics-optics conversion at the intermediate nodes. However, such a provisioning of a complete wavelength tends to be inefficient when there is not enough traffic between the two end-points or when the traffic between them is bursty. In SONET/SDH framing on wavelengths, a time slot structure is created on the wavelength. An end-to-end communication path is established by assigning time slots on wavelengths of successive hops. The intermediate nodes extract/insert data into appropriate time slots. In this approach, the intermediate nodes have to perform optics-electronics-optics conversion for extracting/inserting data (also called multiplexing) into time slots. Since the operating speed of electronic devices is considerably slower than the transmission speed provided by the optical wavelength division multiplexing, the optic-electronics-optic conversion at the intermediate nodes in the data path should be eliminated.

Ideally, an all-optical packet eliminates the electronics entirely, thus removing the speed bottleneck as well as overcoming the shortcomings of the wavelength routing approach. In an all-optical packet switch, the data packets arriving on an incoming optical fiber are switched to an outgoing fiber in an entirely optical domain.

As a presently implementable alternative to all-optical packet switches, optical burst switching still allows the switching of data bursts in the optical domain by performing resource allocation in the electronic domain. In optical burst switching, a control packet precedes every data burst and the control packet and the corresponding data burst are launched at the source at points in time separated by an offset. The offset is determined at the time that the control packet is launched at the source. The control packet includes information required to route the data burst through the network and also includes the length of the corresponding data burst and its offset value. The control packet is processed electronically at each of the intermediate nodes for making routing decisions and the switching fabric at each node is configured accordingly to switch to the data burst that is expected to arrive after a time interval corresponding to the offset field of the control packet. Thus, the data burst is entirely optically switched to eliminate the electronic bottleneck.

SUMMARY OF THE INVENTION

The present invention provides for the determination of the offset between the control packet and the data burst. While the offset must be at least as large as the (worst-case) sum of the processing times for the control packet at each of the intermediate nodes, the present invention determines an offset which can reduce the contention among reservations requested by control packets of different flows (originating at possibly geographically dispersed end points) that traverse a given intermediate node so as to significantly improve the performance of the optical burst switching arrangement. That is, the present invention determines the offsets of successive data bursts of any given flow from their control packets which results in the reliable operation of the optical burst switching wavelength division multiplexing network. The determination is made for any flow independently of other flows. In the present invention, the data bursts of any given flow are effectively released into the network at systematically random times. Further, the release times are uncorrelated across the flows. These effects improve the burst blocking performance at intermediate nodes in the optical burst switching wavelength division multiplexing backbone.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF THE INVENTION

Figure 1:
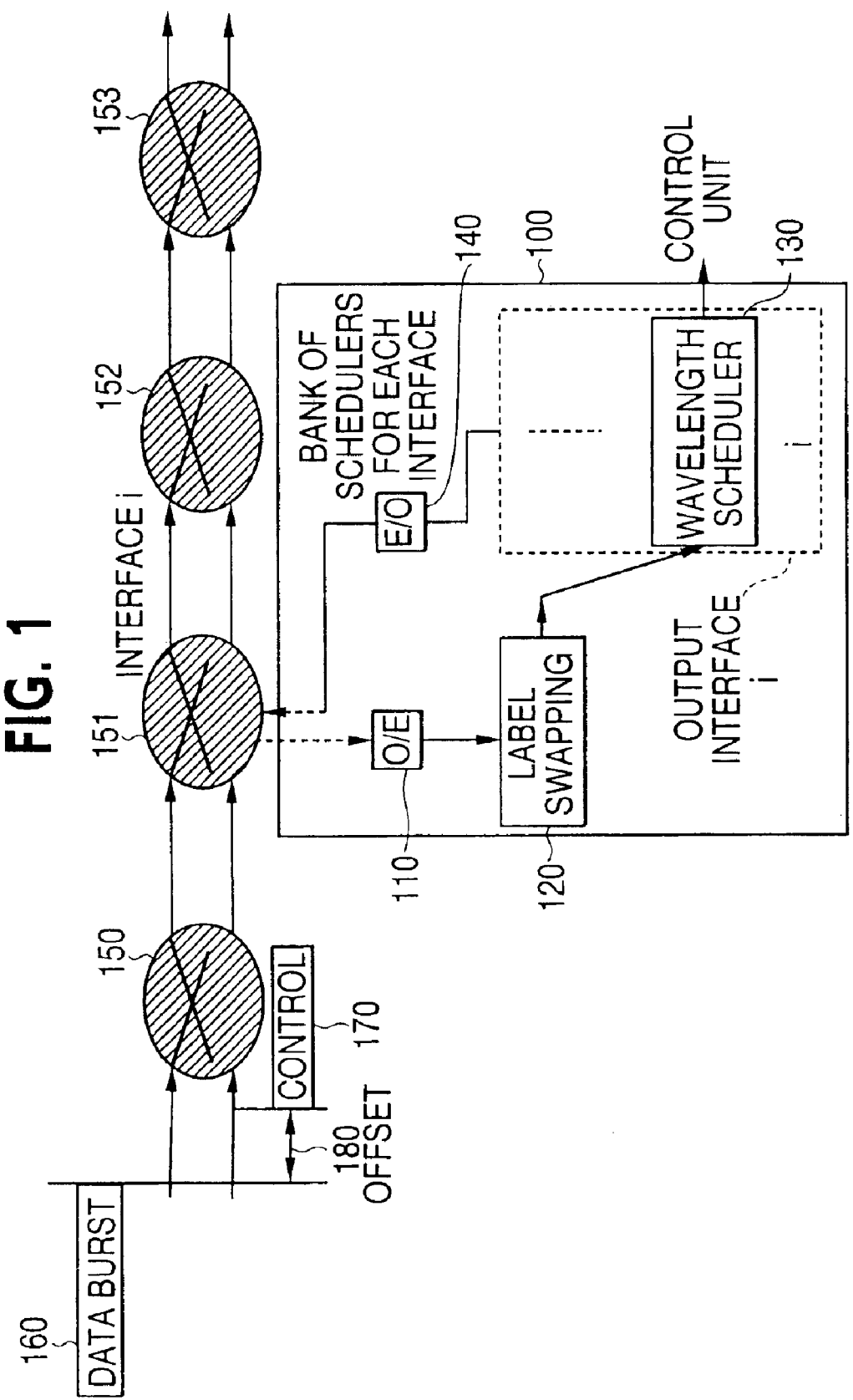
FIG. 1 is a block diagram of an output interface at a node in an optical burst switching wavelength division multiplexing network.

Before beginning a detailed description of the subject invention, mention of the following is in order. When appropriate, like reference numerals and characters may be used to designate identical, corresponding or similar components in differing drawing figures. Furthermore, in the detailed description to follow, example sizes/models/values/ranges may be given, although the present invention is not limited thereto. Still furthermore, the clock and timing signal figures are not drawn to scale, and instead, exemplary and critical time values are mentioned when appropriate. In addition, well-known power connections to the components have not been shown within the drawing figures for simplicity of illustration and discussion and so as not to obscure the invention.

FIG. 1 is a block diagram of an output interface in an optical burst switching node. Nodes 150, 151, 152, and 153 are the intermediate nodes in an end-to-end path of the data burst. When the data burst 160 is ready to be transmitted at the source, first, a control packet 170 is launched, and the data burst is launched after an offset 180 from the start of the control packet 170. In the control unit 100 of an output interface of the given intermediate node, the control packet 170 is first converted from an optical signal into an electrical signal by an optical-electrical converter 110. The control packet is processed in an electronic domain by routing module 120 which performs label swapping for taking routing decisions (i.e., determining the outgoing fiber over which the control packet, and hence the impending data burst, is to be forwarded) and a wavelength scheduler 130 to determine the particular wavelength in the outgoing fiber over which the impending data burst is to be forwarded. The optical cross-connect is configured to switch the data burst corresponding to that control packet that is expected to arrive after the time equal to offset field in the control packet, onto the outgoing fiber and wavelength in that fiber as determined by the routing and wavelength scheduler modules. The control packet is then converted from electrical domain into an optical domain in an electrical-optical converter 140 and is forwarded on the control channel of the outgoing fiber as determined by the routing module above.

Figure 2:
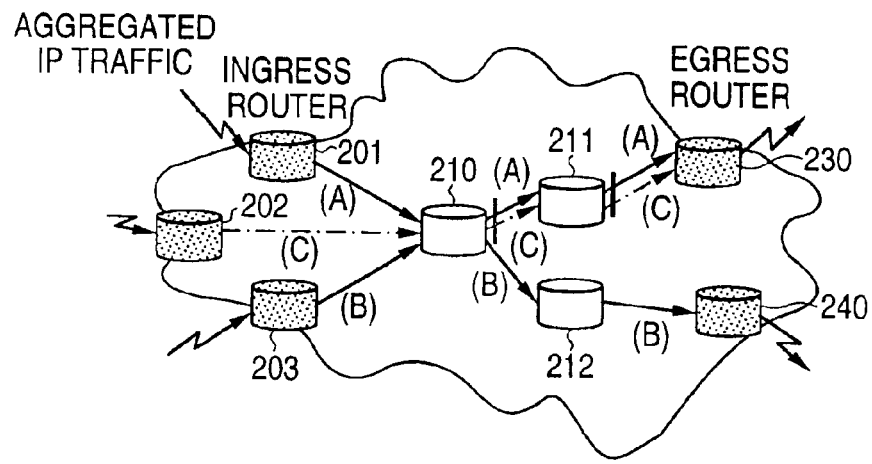
FIG. 2 is a block diagram of an Internet Protocol (IP) network implemented over an optical burst switching wavelength division multiplexing backbone using multiprotocol label switching.

FIG. 2 is a block diagram of a transporting network Internet Protocol (IP) traffic over an optical burst switching wavelength division multiplexing transmission backbone using multiprotocol label switching.

Internet Protocol (IP) routers 201, 202, and 203 are disposed at the ingress of the optical backbone and Internet Protocol routers 230 and 240 are disposed at the egress of the backbone. Intermediate optical cross-connects (nodes) 210, 211, and 212 are disposed between the ingress routers and the egress routers. Data bursts are assembled at the ingress routers and delivered to the egress routers via the intermediate nodes using optical burst switching. It is assumed that there is no buffering of data bursts at the intermediate nodes. Semi-permanent data pipes can be set up between different ingress-egress pairs using multiprotocol label switching (MPLS).

An Internet Protocol routing engine causes a major bottleneck at high transmission speeds due to its processing requirements. Multiprotocol label switching (MPLS) is a forwarding technique which uses the labels associated with packets to make packet forwarding decisions at the network nodes rather than by conventional destination-based hop-by-hop forwarding arrangements. In multiprotocol label switching (MPLS), the space of all possible forwarding options is partitioned into forwarding equivalence classes. For example, all of the packets destined for a given egress node which have the same quality of service requirement may belong to the same forwarding equivalence class. The packets are labeled at the ingress in accordance with the forwarding equivalence class with which they belong. Each of the intermediate nodes uses the label of an incoming packet to determine its next hop and also performs label swapping, that is, it replaces the incoming label with the new outgoing label which identifies the respective forwarding equivalence class for the downstream node. Such a label-based forwarding technique reduces the processing overhead required for routing at the intermediate nodes, thereby improving their packet forwarding performance and scalability. Furthermore, the label swapping used by multiprotocol label switching can be used to create a multipoint to point routing tree rather than a routing mesh used in conventional networks. Multiprotocol label switching also provides constraint-based routing in which the ingress node can establish an explicit route through the network rather than inefficiently carrying the explicit route in each packet. Instead, multiprotocol label switching allows the explicit route to be carried only at the time that the label switched path is set up. The subsequent packets traversing this path are forwarded using packet labels.

The control packets that precede the data bursts can be used to carry multiprotocol label switching (MPLS) labels. The intermediate nodes use the labels in incoming control packets in addition to offset and length of data burst fields to set up the switch fabric for the data burst. The data bursts do not need to carry any labels. Multiprotocol label switching (MPLS) allows the establishment of data pipes through an optical burst switching wavelength division multiplexing domain between different ingress-egress router pairs. These data pipes will be referred to hereinafter as optical LSP's (label switched paths).

Figure 3:
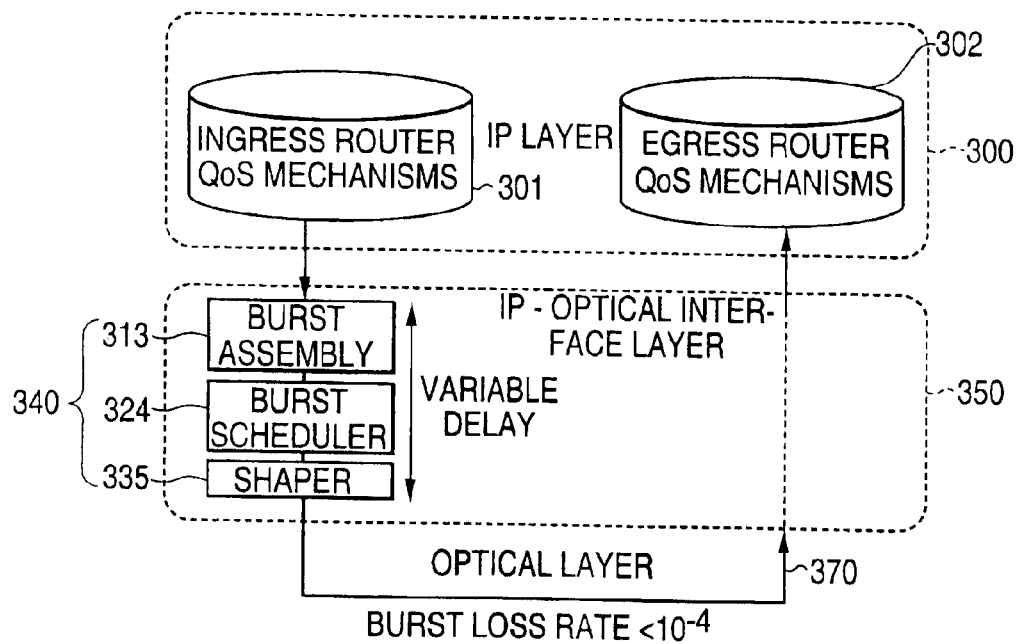
FIG. 3 is a block diagram illustrating a shaping interface between the Internet Protocol layer and the wavelength division multiplexing optical layer.

FIG. 3 is a block diagram that comprehensively depicts various operations occurring in the end-to-end data path. Note that the operations occurring in the control path have already been discussed in relation to FIG. 1. A medium access control interface 350 is shown as being disposed between the Internet Protocol (IP) layer 300 and the optical layer 370. The medium access control layer 350, which includes a burst assembly 313 and a burst scheduler 324 and shaper 335. The burst assembly module 313 assembles data bursts from the packets generated by the Internet Protocol (IP) layer 300 for each optical LSP. It is possible for the burst assembly module to assemble a plurality of data bursts simultaneously. The burst schedule module 324 determines the sequence in which the assembled data bursts are to be released onto the optical LSP. The stream of data bursts at the output of the burst scheduler 324 is inputted to the shaper 335. For every data burst, the shaper 335 determines the value of the offset to be maintained between that data burst and its corresponding control packet. The shaper 335 then forms the control packet and transmits it over the control channel of the optical LSP. The control packet includes information such as the offset value between the data burst and itself, the length of the data burst and the routing label. The shaper 335 causes the data burst to be outputted to the optical LSP after being delayed a period of time equal to the offset value after the control packet has been transmitted.

Note that all the processing in the data path occurs at the source and the destination of the optical LSP, while the intermediate nodes are transparent to the data path. This transparency is due to the processing that occurs in the control path at every intermediate node.

Various quality of service and priority considerations can be used at the Internet Protocol (IP) layer 300, at the burst assembly module 313, and at the burst scheduler module 324. Examples are DiffServ at the Internet Protocol (IP) layer 350, a timer-based burst assembly for delay-sensitive data at the burst assembly module 313 and prioritized burst scheduling at the burst scheduler module 324.

An output interface of a node in the optical burst switching wavelength division multiplexing domain receives traffic from different optical LSP's. This creates the potential for contention among the data bursts of different optical LSP'S. When the control packets from different optical LSP's request reservations for their data bursts on a particular wavelength of a given output fiber for time intervals which overlap each other, hereinafter referred to as burst blocking, only one of these requests can be granted. Accordingly, some control packets must be dropped at that interface; and this, in turn, results in the loss of data bursts corresponding to the dropped control packets.

The data loss rate due to burst blocking will be large if the reservation requests arriving at a given output interface from different optical LSP's are time correlated. Such time correlation often arises due to transmission control protocol (TCP) that is widely used in the Internet for end-to-end data transport reliability, and congestion and flow control. Furthermore, due to the unpredictability of traffic, it is difficult to always guarantee a low burst blocking probability.

In accordance with a present invention, a shaping mechanism, including the shaper 335, for example, is incorporated in the medium access control layer 350 at the ingress thereof which facilitates the determination of offsets of the successive data bursts of a particular optical LSP from their corresponding control packets so as to maintain a low burst blocking probability at all times in the optical burst switching wavelength division multiplexing layer. The shaping mechanism removes proactively the time correlation among the reservation requests of different optical LSP's and enforces predetermined statistics on the data stream entering the optical burst switching wavelength division multiplexing layer, irrespective of the statistics of packet arrivals from the Internet Protocol (IP) layer that resides over it. Due to the bufferless operation of the optical burst switching wavelength division multiplexing layer, this statistic is invariant, even if the burst stream traverses multiple nodes in the optical burst switching wavelength division multiplexing domain. The knowledge of statistics (enforced by the shaper) of burst arrivals from different optical LSP's that share an outgoing interface at any intermediate node allows for the computation of the burst blocking probability at that output interface. This computation can be combined with the admission control scheme so as to maintain a low burst blocking probability.

The offset between a data burst and its corresponding control packet has two parts, namely, a constant part to account for the processing time of the control packet at the intermediate nodes and a variable part which is varied from burst to burst to lower the probability of burst blocking. The variable part of the offset for the i th data burst, denoted by $\delta_i$, is determined as follows:

Let $T0=0, T_1, T_2, \ldots$ denote the times of occurrences of points of a random point process in which the time periods between the occurrences of successive points (i.e., Ti-Ti-1, for $i \geq 1$) are independently and identically distributed according to the probability distribution F(.). Let $T0(\omega)=0$, $T_1(\omega), T2(\omega), \ldots$ denotes a particular realization (sample path) of this random point process. If the i th data burst arrives at the shaper at time ai, and that the (i−1)th data burst is released at $T_{ki-1}(\omega)$, then the i th burst is released at time $$T_{k(i-1)}$$

where $T_{ki}(\omega)$ is the first point after $T_{k(i-1)}(\omega)$ satisfying the following inequality:

$$T_{ki}(\omega) - T_{k(i-1)}(\omega) \geq L_{i-1} \text{ and } T_1(\omega) \geq \alpha_i.$$

Hence, the offset between the i th data burst and the control packet corresponding to it is determined by the following equation:

$$\delta_i = T_{ki}(\omega) - \alpha_i.$$

The shaping scheme described above (see FIG. 4) is equivalent to leaky bucket regulator with no buffering provided for tokens, and in which tokens arrive at $T0(\omega)$, $T1(\omega), T2(\omega), \ldots$.

Figure 4:
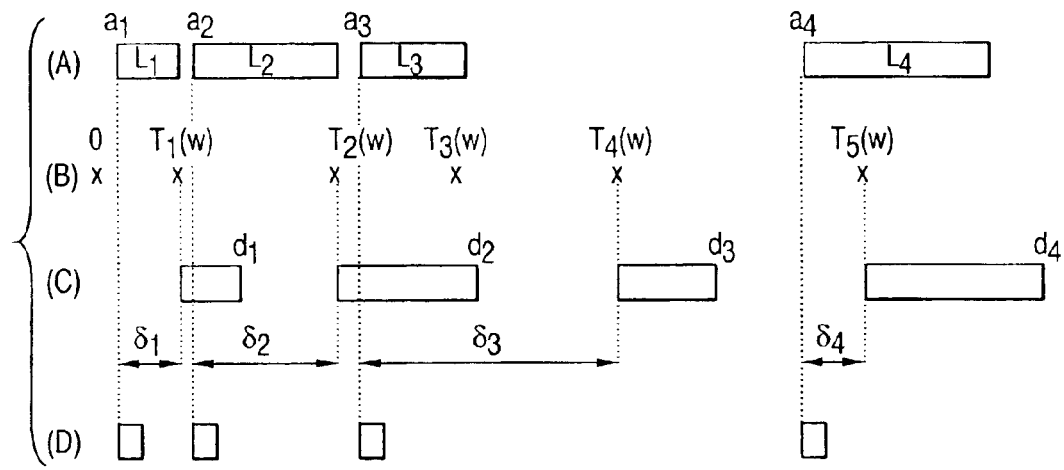
FIG. 4 is a timing diagram of the data bursts before and after shaping and the control packets.

FIG. 4 is a timing diagram of the data bursts of a given optical LSP before and after shaping and the control packets. FIG. 4(A) illustrates the data bursts of sizes L1, L2, L3, and L4 before shaping by the shaper 335. They arrive at the shaper at times a1, a2, a3, and a4, respectively. FIG. 4(B) illustrates the arrival of the tokens T0, T1, T2, T3, T4 and T5. FIG. 4(C) illustrates the completion times d1, d2, d3,d4 of data bursts release at the output of the shaper. FIG. 4(D) illustrates the control packets corresponding to the data bursts of FIG. 4(A).

As illustrated in FIG. 4, the data bursts are of an arbitrary length. As noted above, the token arrivals have been chosen so as to be randomly distributed. The first data burst of size L1 is inputted to the shaper at time a1. The control packet for that burst is formed and immediately launched. The shaper 335 releases the data burst into the optical LSP at time $T1(\omega)$ by having its transmission beginning at the arrival of token T1 which occurs at a time $\delta1$ after the start of the control packet corresponding to the data burst L1. Thus, $\delta1$ is also the offset value in the offset field of the control packet. Similarly, after shaping, the second shaped data burst of size L2 has its transmission beginning at the arrival of the token $T2(\omega)$ which occurs at a time $\delta2$ after the start of the control packet corresponding to the data burst L2. Shaped data burst of length L3, on the other hand, has its transmission beginning at the arrival of token $T4(\omega)$ which occurs at a time $\delta3$ from the start of the control packet corresponding to that data burst. This is due to the fact that the token $T3(\omega)$ arrives during the pendency of the shaped data burst L2, which terminates at d2. Since the shaped data burst L3 can not commence prior to the completion of the shaped data burst L2, token $T3(\omega)$ is not used. Shaped data burst L4 has its transmission beginning at the arrival of token $T5(\omega)$ which occurs at a time $\delta4$ from the start of the control packet corresponding to the data burst L4.

The type of shaping described above regulates the average rate at which data bursts of a given optical LSP are released into the optical burst switching wavelength division multiplexing layer. This rate is equal to the reciprocal of the mean of the probability distribution F(.) used to generate the tokens. Furthermore, the randomized generation of tokens prevents synchronization among the data burst streams of different optical LSP's. This is significant in that if the data burst streams of two optical LSP's traversing the same output interface of a particular node in the optical burst switching wavelength division multiplexing network happen to be synchronized, the probably of burst blocking at that interface will be high, thereby causing excessive data losses. Note that, with deterministic offsets, such a synchronization will often arise especially when transmission control protocol (TCP) is used for end-to-end data transport.

Another crucial benefit of the proposed shaping scheme is that it imposes the following property on the stream of data bursts of any optical LSP. Let $\{A(t)\}_{t \geq 0}$ denote total data arriving over an optical LSP until time t at any node (ingress or intermediate) in the optical burst switching wavelength division multiplexing network. Then, $$A(t)-A(s) \leq A_x(t)-A_x(s), \text{ a.s., (almost surely), for all } t \geq s, \quad (1)$$

where $\{A_x(t)\}_{t \geq 0}$ denotes total data that would have arrived on that LSP until time t at that node, if data bursts were arriving at T0, T1, T2, . . .

It is easy to see that the domination as in Eq. 1 holds at the output of the shaper of every optical LSP, by virtue of the shaping scheme. As data bursts traverse various nodes in the optical backbone, some of them can only be discarded, due to contention. Furthermore, due to inherently bufferless forwarding, the relative positions of the data bursts of any optical LSP remain unchanged even after these data bursts traverse a number of nodes. Hence, the domination as in Eq. 1 holds at the output interface of every node that a given optical LSP traverses.

A framework for traffic engineering, based on the above noted shaping scheme, is provided below and in addition, the role of this shaping scheme in improving the performance of an optical burst switching wavelength division multiplexing layer will be demonstrated below via simulations for the case of TCP/IP traffic.

The following is a description of one example of how the shaping scheme can be used for traffic engineering in an optical burst switching wavelength division multiplexing network. Consider an output interface of any node in an optical burst switching wavelength division multiplexing network. Suppose that this node is being traversed by N optical LSP's with the provisional data rates of $r_1, \ldots, r_N$, respectively. If the data bursts entering into these LSP's are shaped at the ingress using Poisson shapers (this means that the probability distribution for the time interval between the successive tokens of the i th optical LSP, denoted by $F_i(.)$, is chosen to be exponential), the following holds for their data arriving at the output interface under consideration. For all $t \geq s$, $$Ai(t)-Ai(s) \leq AP(r_1)(t)-AP(r_1)(s),$$

a s, for all $1 \leq i \leq N$, and $\quad (2)$ $$A(t) - A(s) = \sum_{i=1}^{N} A_i(t) - A_i(s)) \leq A_{P(r)}(t) - A_{P(r)}(s), \text{ a.s.} \quad (3)$$

Here, Ai(t) denotes the total data arriving over the i th optical LSP until time t, AP(r)(t) denotes the data that would arrive if the data bursts were arriving according to a Poisson process of rate r, and $$r = \sum_{i=1}^{N} r_i.$$

Now, if $p_{actual}(r_1, \ldots, r_N)$ denotes the actual burst blocking probability at the given output interface, it is intuitively appealing to say that $$p_{actual}(r_1, \ldots, r_N) \leq p_{Poisson}(r), \quad (4)$$

where $p_{Poisson}(r)$ denotes the burst blocking probability at that interface if the bursts were arriving according to the Poisson process of rate r. The right hand side of Inequality 4 is given by the well known Erlang loss formula, $$p_{Poisson}(r) = \frac{(r/\mu)^c/c!}{\sum_{i=0}^{c} (r/\mu)^c/c!} \quad (5)$$

where c is the total number of wavelengths at the output interface, and $1/\mu$ is the average burst transmission time.

If the establishment of a new optical LSP, requiring a data rate of $r_{N+1}$ and a burst blocking probability of $p_{N+1}$, is requested through a given output interface, it can be admitted if and only if $$p_{Poisson}(r) \leq p_{N+1}, \text{ with } r = \sum_{i=1}^{N+1} r_i \quad (6)$$

By virtue of the shaping scheme and the connection admission control procedure described above, the burst blocking performance of every optical LSP is guaranteed. It is also possible to render some end-to-end delay characteristics to optical LSP as follows.

As seen from FIG. 3, the various elements in the MAC layer 350 such as the burst assembler 313, the burst scheduler 324 and the shaper 335, introduce some amount of delay at the ingress of an optical LSP. Since the former two are not discussed in detail herein, the following is a description of how to control the component of end-to-end delay that is due to shaper 335. Assume that the establishment of an optical LSP, requiring a data rate of $r_{N+1}$, a burst blocking probability of $P_{N+1}$ and an end-to-end delay guarantee of $D_{N+1}$, is requested between a chosen ingress-egress pair. The actual token rate may be chosen such that:

Prob[Time interval between successive tokens>

$D_1] \leq \square$, and Token rate$>r_{N+1}$. $\quad (7)$

This value token rate is then used in Eq. 6 in place of $r_{N+1}$ to take admission control decision.

Figure 6:
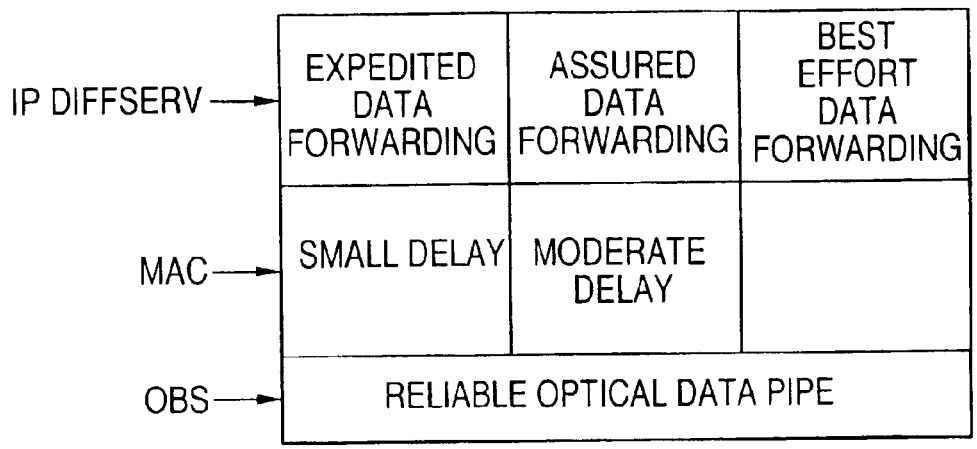
FIG. 6 illustrates the mapping of Internet Protocol classes onto optical label switched paths.

FIG. 6 shows how IP DiffServ classes can be mapped onto optical LSP's that are now reliable, as well as have certain delay characteristics.

Figure 7:
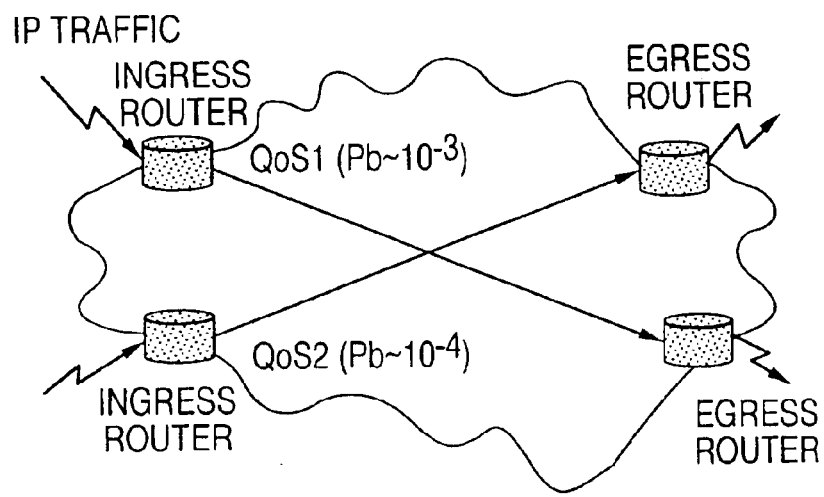
FIG. 7 illustrates quality of service differentiation in terms of burst blocking probability.

Another quality of service dimension is to provide a number of optical LSP's in the optical backbone, each providing different levels of reliability given in terms of burst blocking probability. The reliability of different optical LSP's can then be mapped onto some cost function. This, in turn, can be used by the routing protocols to forward IP packets to appropriate edge routers depending on their quality of service needs (now in terms of loss rate). This is depicted in FIG. 7.

The bottleneck output interface (fiber) of a node in an OBS WDM network supporting three OC12 wavelengths (622 Mb/s per wavelength) per output interface has been simulated. This interface is traversed by a number of optical LSP's. Ten such optical LSP's each carrying ingress-to-egress data traffic supported on TCP/IP are assumed. There are (forward paths of) 4 TCP sessions in each of these optical LSP's. The acknowledgment paths (or reverse paths) of these TCP's are taken to be lossless, and they introduce only a constant delay. Simulations were run with a simulation tool.

Each of the 40 TCP sessions is started at time instant sampled from the uniform distribution over (0 s, 1 s). Once started, all TCP sources always have data to send. For simplicity, every data burst that is assembled at the MAC layer is taken to be precisely one IP packet. The delay introduced by the reverse path of every TCP session is sampled from the uniform distribution as explained in the next section.

Figure 5:
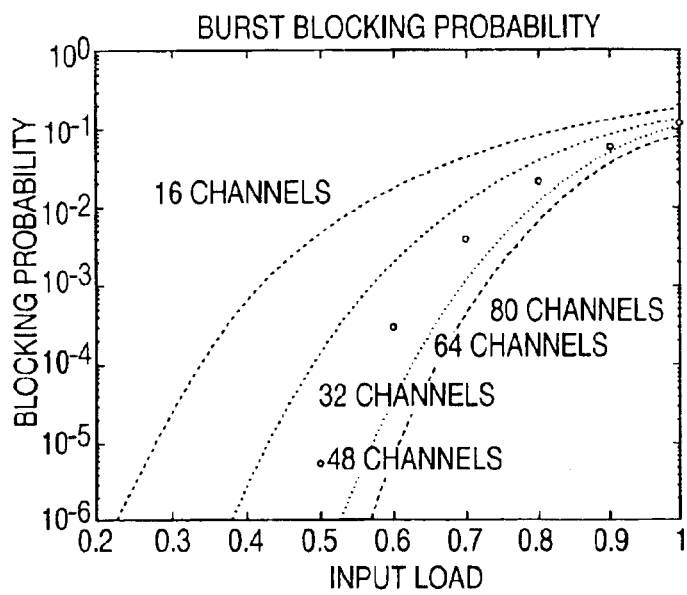
FIG. 5 illustrates the burst blocking probability as a function of the offered load for an interface supporting various numbers of wavelengths.

As shown in FIG. 5, the burst traffic offered to each LSP is shaped at the ingress. The probability distribution Fi(.) used in shaping the burst traffic of the i th optical LSP is taken to be exponential with a mean 1/r1. This causes the data burst arrivals at the output of each shaper to be dominated by the Poisson process of rate r1, and the total process of data bursts at the bottleneck output interface to be dominated by the Poisson process of rate $$r = \sum_{i=1}^{10} r_i.$$

Simple greedy and exhaustive wavelength selection policy may be used to assign the reservations to the control packets arriving at the bottleneck output interface. Simulation experiments have been run in different regimes of the target burst blocking probability, namely, $10^{-2}$, $10^{-3}$ and $10^{-4}$. For each of these values, the total allowable load rat that output interface is calculated using Erlang loss formula (Eq. 5), with c=3. $r_i$ is then taken to be r/10, for i=1, . . . , 10. For the target burst blocking probabilities of $10^{-2}$, $10^{-3}$ and $10^{-4}$, the delay introduced by the reverse path of every TCP session is sampled from the uniform distribution over [0 ms, 1 ms), [0 ms, 25 ms) and [0 ms, 50 ms), respectively. This is done so that the actual aggregate load offered by all TCP's is not much lower than the designed throughput value. For example, 40 TCP's fail to offer an average load as large as about 311 Mb/s at the packet loss probability of $10^{-2}$ in the end-to-end path, if their round trip times are larger than about 1 ms. It is as fundamental fact that the TCP throughput significantly deteriorates if the end-to-end packet loss probability is much larger than the inverse square of the product of the bottleneck bandwidth and the round trip delay. And, it is clearly trivial to establish Inequality 4 if the offered average load itself is much lower than the designed value for the load. The results are shown in the Table 1 below.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims, without departing from the spirit of the invention. In addition to variations and modifications in the component parts and/or arrangements, alternative uses will also be apparent to those skilled in the art.

We claim:

1. A method of selecting an offset between data bursts and control packets in an optical burst switching arrangement, the method comprising:

randomly generating tokens;

receiving a plurality of sequentially generated data bursts;

receiving control packets, each control packet corresponding to one of the data bursts; and outputting one of the control packets and then outputting a corresponding data burst at a time corresponding to generation of a first of the tokens which occurs at a time in which no data burst is being outputted and the outputting of the corresponding data burst is offset from outputting of the corresponding control packet by a time period.

2. The method of claim 1, wherein an average rate at which the data bursts are outputted is equal to a reciprocal of a mean of a probability distribution used to generate the tokens.

3. The method of claim 2, wherein if T0=0, T1, T2, . . . Ti denote times of occurrences of points of a random point process in which time periods between occurrences of successive points (Ti–T(i–1) for i>1) are independently and identically distributed according to a probability distribution F(.) and if T0(ω)=0, T1(ω), T2(ω), . . . denote a realization of the random point process and if the i th data burst arrives at a time ai, and the (i–1)th data burst is outputted at T(ki–1))(ω), then the i th data burst is outputted at time Tki(ω) which is a first point after T(ki–1))(ω) satisfying the following inequality:

Tki(ω)–T(ki–1)(ω)>L(i–1) and Tki(ω)≧ai, L(i–1) being the (i–1)th inputted data burst size;

and wherein:

δi=Tki(ω)–ai with δi being the offset between the i th data burst and a corresponding control packet.

4. The method of claim 3, wherein the tokens are randomly generated according to a Poisson process.

5. The method of claim 2, wherein the tokens are randomly generated according to a Poisson process.

|  | Throughput (MB/s) | | | Burst blocking probability | | |
|---|---|---|---|---|---|---|
|  | With shaping | | Without | With shaping | | Without |
| Simulation experiment | Observed | Designed | shaping | Observed | Designed | shaping |
| 1 | 302.29 | 311.00 | 10.64 | $0.73 \times 10^{-2}$ | $1.72 \times 10^{-2}$ | $1.57 \times 10^{-1}$ |
| 2 | 146.68 | 155.0 | 29.05 | $1.17 \times 1010^{-3}$ | $2.00 \times 10^{-3}$ | $0.97 \times 10^{-1}$ |
| 3 | 62.20 | 62.20 | 26.97 | $0.7 \times 10^{-5}$ | $1.51 \times 10^{-4}$ | $0.93 \times 10^{-1}$ |

6. The method of claim 1, wherein if T0=0, T1, T2, . . . Ti denote denote times of occurrences of points of a random point process in which time periods between occurrences of successive points (Ti–T(i–1) for i>1) are independently and identically distributed according to a probability distribution F(.) and if T0(ω)=0, T1(ω), T2(ω), . . . denote a realization of the random point process and if the i th data burst arrives at a time ai, and the (i−1)th data burst is outputted at T(ki−1))(ω), then the i th data burst is outputted at time Tki(ω) which is a first point after T(ki−1))(ω) satisfying the following inequality:

Tki(ω)−T(ki−1)(ω)>L(i−1) and Tki(ω)≧ai,L(i−1) being the(i−1)th inputted data burst size;

and wherein:

δi=Tki(ω)−ai with δi being the offset between the i th data burst and a corresponding control packet.

7. The method of claim 6, wherein the tokens are randomly generated according to a Poisson process.

8. The method of claim 1, wherein the tokens are randomly generated according to a Poisson process.

9. The method of claim 1 wherein:

after the outputting one of the control packets and then outputting a corresponding data burst at a time corresponding to generation of a first of the tokens, sequentially outputting a remainder of the control packets while sequentially outputting corresponding data bursts in a sequence in time corresponding to a sequent in time of generation of a remainder of the tokens which also occurs at times when no data burst is being outputted.

10. The method of claim 9 wherein if T0=0, T1, T2, . . . Ti denote times of occurrences of points of a random point process in which time periods between occurrences of successive points (Ti−T(i−1) for i>1) are independently and identically distributed according to a probability distribution F(.) and if T0(ω)=0, T1(ω), T2(ω), . . . denote a realization of the random point process and if the i th data burst arrives at a time ai, and the (i−1)th data burst is outputted at T(ki−1))(ω), then the i th data burst is outputted at time Tki(ω) which is a first point after T(ki−1))(ω) satisfying the following inequality:

Tki(ω)−T(ki−1)(ω)>L(i−1) and Tki(ω)≧ai,L(i−1) being the(i−1)th inputted data burst size;

and wherein:

δi=Tki(ω)−ai with δi being the offset between the i th data burst and a corresponding control packet.

11. The method of claim 10 wherein the tokens are randomly generated according to a Poisson process.

12. The method of claim 9 wherein the tokens are randomly generated according to a Poisson process.

13. An apparatus for selecting an offset between data bursts and control packets in an optical burst switching arrangement, the apparatus comprising:

a token generator for randomly generating tokens;

a data burst receiver for receiving sequentially generated data bursts;

a control packet receiver for receiving control packets, each control packet corresponding to a one of the data bursts; and a transmitter for outputting one of the control packets received by the control packet receiver and for then outputting a corresponding data burst received by the data burst receiver at a time corresponding to generation of a first of the tokens by the token generator which occurs at a time in which no data burst is being outputted by the transmitter and outputting of the data burst is offset from outputting of the corresponding respective control packet by a time period.

14. The apparatus of claim 13, wherein the transmitter outputs the data bursts at an average rate which is equal to a reciprocal of a mean of a probability distribution used to generate the tokens.

15. The apparatus of claim 14, wherein if T0=0, T1, T2, . . . denote times of occurrences of points of a random point process in which time periods between occurrences of successive points (Ti−T(i−1) for i>1) are independently and identically distributed according to a probability distribution F(.) and if T0(ω)=0, T1(ω), T2(ω), . . . denote a realization of the random point process and if the i th data burst arrives at a time ai, and the (i−1)th data burst is outputted at T(ki−1))(ω), then the i th data burst is outputted at time Tki(ω) which is a first point after T(ki−1))(ω) satisfying the following inequality:

Tki(ω)−T(ki−1)(ω)>L(i−1) and Tki(ω)≧ai,L(i−1) being the(i−1)th inputted data burst size;

and wherein:

δi=Tki(ω)−ai with δi being the offset between the i th data burst and a corresponding control packet.

16. The apparatus of claim 15, wherein the token generator randomly generates the tokens according to a Poisson process.

17. The apparatus of claim 14, wherein the token generator randomly generates the tokens according to a Poisson process.

18. The apparatus of claim 13, wherein if T0=0, T1, T2, . . . Ti denote times of occurrences of points of a random point process in which time periods between occurrences of successive points (Ti−T(i−1) for i>1) are independently and identically distributed according to a probability distribution F(.) and if T0(ω)=0, T1(ω), T2(ω), . . . denote a realization of the random point process and if the i th data burst arrives at a time ai, and the (i−1)th data burst is outputted at T(ki−1))(ω), then the i th data burst is outputted at time Tki(ω) which is a first point after T(ki−1))(ω) satisfying the following inequality:

Tki(ω)−T(ki−1)(ω)>L(i−1) and Tki(ω)≧ai,L(i−1) being the(i−1)th inputted data burst size;

and wherein:

δi=Tki(ω)−ai with δi being the offset between the i th data burst and a corresponding control packet.

19. The apparatus of claim 18, wherein the token generator randomly generates the tokens according to a Poisson process.

20. The apparatus of claim 13, wherein the token generator randomly generates the tokens according to a Poisson process.

21. The apparatus of claim 13 wherein:

after the outputting one of the control packets and then outputting a corresponding data burst at a time corresponding to generation of a first of the tokens, sequentially outputting a remainder of the control packets while sequentially outputting corresponding data bursts in a sequence in time corresponding to a sequent in time of generation of a remainder of the tokens which also occurs at times when no data burst is being outputted.

22. The apparatus of claim 21 wherein if T0=0, T1, T2, . . . Ti denote times of occurrences of points of a random point process in which time periods between occurrences of successive points (Ti−T(i−1) for i>1) are independently and identically distributed according to a probability distribution F(.) and if T0(ω)=0, T1(ω), T2(ω), . . . denote a realization of the random point process and if the i th data burst arrives at a time ai, and the (i−1)th data burst is outputted at T(ki−1))(ω), then the i th data burst is outputted at time Tki(ω) which is a first point after T(ki−1))(ω) satisfying the following inequality:

Tki(ω)−T(ki−1)(ω)>L(i−1) and Tki(ω)≧ai,L(i−1) being the(i−1)th inputted data burst size;

and wherein:

$\delta i = Tki(\omega) - ai$ with $\delta i$ being the offset between the i th data burst and a corresponding control packet.

23. The apparatus of claim 22 wherein the tokens are randomly generated according to a Poisson process.

24. The apparatus of claim 21 wherein the tokens are randomly generated according to a Poisson process.

25. An optical burst switching apparatus comprising:

a source generator for generating data bursts and corresponding control packets, each data burst being generated at a time which is offset from a corresponding control packet;

an ingress router for receiving and outputting data bursts and corresponding control packets generated by the source generator;

an egress router for receiving and outputting the output of the ingress router;

at least one intermediate node, disposed between the ingress router and the egress router, for transmitting the data bursts and corresponding control packets; and wherein the source generator comprises a token generator for randomly generating a plurality of tokens, a data burst receiver for receiving sequentially generated data bursts, a control packet receiver for receiving the control packets, each control packet corresponding to one of the data bursts, and a transmitter for outputting one of the control packets received by the control packet receiver and for then outputting the corresponding data burst received by the data burst receiver at a time corresponding to generation of the first of the tokens by the token generator which occurs at a time in which no data burst is being outputted by the transmitter, outputting of the data burst being offset from the outputting of the corresponding control packet by a time period.

26. The apparatus of claim 25, wherein the transmitter outputs the data bursts at an average rate which is equal to a reciprocal of a mean of a probability distribution used to generate the tokens.

27. The apparatus of claim 26, wherein if T0=0, T1, T2, ... Ti denote times of occurrences of points of a random point process in which time periods between occurrences of successive points (Ti–T(i–1) for i>1) are independently and identically distributed according to a probability distribution F(.) and if $T0(\omega)=0$, $T1(\omega)$, $T2(\omega)$, ... denote a realization of the random point process and if the i th data burst arrives at a time ai, and the (i–1)th data burst is outputted at T(ki–1))($\omega$), then the i th data burst is outputted at time Tki($\omega$) which is a first point after T(ki–1))($\omega$) satisfying the following inequality:

Tki($\omega$)–T(ki–1)($\omega$)>L(i–1) and Tki($\omega$)$\geq$ai, L(i–1) being the(i–1)th inputted data burst size;

and wherein:

$\delta i = Tki(\omega) - ai$ with $\delta i$ being the offset between the i th data burst and a corresponding control packet.

28. The apparatus of claim 25, wherein if T0=0, T1, T2, ... Ti denote times of occurrences of points of a random point process in which time periods between occurrences of successive points (Ti–T(i–1) for i>1) are independently and identically distributed according to a probability distribution F(.) and if $T0(\omega)=0$, $T1(\omega)$, $T2(\omega)$, ... denote a realization of the random point process and if the i th data burst arrives at a time ai, and the (i–1)th data burst is outputted at T(ki–1))($\omega$), then the i th data burst is outputted at time Tki($\omega$) which is a first point after T(ki–1))($\omega$) satisfying the following inequality:

Tki($\omega$)–T(ki–1)($\omega$)>L(i–1) and Tki($\omega$)$\geq$ai,L(i–1) being the(i–1)th inputted data burst size;

and wherein:

$\delta i = Tki(\omega) - ai$ with $\delta i$ being the offset between the i th data burst and a corresponding control packet.

29. The optical burst switching apparatus of claim 25 wherein:

after the outputting one of the control packets and then outputting a corresponding data burst at a time corresponding to generation of a first of the tokens, sequentially outputting a remainder of the control packets while sequentially outputting corresponding data bursts in a sequence in time corresponding to a sequent in time of generation of a remainder of the tokens which also occurs at times when no data burst is being outputted.

30. The optical burst switching apparatus of claim 29 wherein if T0=0, T1, T2, ... Ti denote times of occurrences of points of a random point process in which time periods between occurrences of successive points (Ti–T(i–1) for i>1) are independently and identically distributed according to a probability distribution F(.) and if $T0(\omega)=0$, $T1(\omega)$, $T2(\omega)$, ... denote a realization of the random point process and if the i th data burst arrives at a time ai, and the (i–1)th data burst is outputted at T(ki–1))($\omega$), then the i th data burst is outputted at time Tki($\omega$) which is a first point after T(ki–1))($\omega$) satisfying the following inequality:

Tki($\omega$)–T(ki–1)($\omega$)>L(i–1) and Tki($\omega$)$\geq$ai, L(i–1) being the(i–1)th inputted data burst size;

and wherein:

$\delta i = Tki(\omega) - ai$ with $\delta i$ being the offset between the i th data burst and a corresponding control packet.

31. The optical burst switching apparatus of claim 30 wherein the tokens are randomly generated according to a Poisson process.

32. The optical burst switching apparatus of claim 29 wherein the tokens are randomly generated according to a Poisson process.

* * * * *

UNITED STATES PATENT AND TRADEMARK OFFICE
CERTIFICATE OF CORRECTION

PATENT NO. : 6,898,205 B1
DATED : May 24, 2005
INVENTOR(S) : Hermant Chaskar et al.

It is certified that error appears in the above-identified patent and that said Letters Patent is hereby corrected as shown below:

<u>Title page,</u>
Item [75], Inventors, please correct the inventor's name from "Sudir Dixit" to -- Sudhir Dixit --.

Signed and Sealed this

Twelfth Day of July, 2005

JON W. DUDAS
*Director of the United States Patent and Trademark Office*